(12) United States Patent
Shelestak

(10) Patent No.: US 7,678,722 B2
(45) Date of Patent: Mar. 16, 2010

(54) GREEN GLASS COMPOSITION

(75) Inventor: Larry J. Shelestak, Bairdford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 899 days.

(21) Appl. No.: 11/192,497

(22) Filed: Jul. 29, 2005

(65) Prior Publication Data

US 2007/0027021 A1    Feb. 1, 2007

(51) Int. Cl.
    *C03C 6/04*    (2006.01)
(52) U.S. Cl. .......................... 501/70; 501/72
(58) Field of Classification Search ........... 501/70, 501/72; 428/426
    See application file for complete search history.

(56) References Cited

U.S. PATENT DOCUMENTS

| | | | |
|---|---|---|---|
| 4,792,536 A | 12/1988 | Pecoraro et al. | 501/70 |
| 5,240,886 A | 8/1993 | Gulotta et al. | 501/70 |
| 5,372,977 A | 12/1994 | Mazon-Ramos et al. | 501/57 |
| 5,385,872 A | 1/1995 | Gulotta et al. | 501/71 |
| 5,593,929 A | 1/1997 | Krumwiede et al. | 501/70 |
| 5,641,716 A * | 6/1997 | Higby et al. | 501/27 |
| 5,723,390 A | 3/1998 | Kijima et al. | 501/70 |
| 5,747,398 A | 5/1998 | Higby et al. | 501/66 |
| 5,780,372 A | 7/1998 | Higby et al. | 501/70 |
| 5,830,812 A * | 11/1998 | Shelestak et al. | 501/71 |
| 5,830,814 A | 11/1998 | Combes | 501/70 |
| 5,837,629 A | 11/1998 | Combes et al. | 501/70 |
| 5,897,956 A * | 4/1999 | Kijima et al. | 428/426 |
| 6,046,122 A | 4/2000 | Nagashima et al. | 501/64 |

FOREIGN PATENT DOCUMENTS

| | | |
|---|---|---|
| EP | 0 297 404 | 1/1989 |
| EP | 0 979 804 | 2/2000 |
| EP | 453551 B1 | 5/2000 |
| EP | 1031543 A1 | 8/2000 |
| EP | 1 681 277 | 7/2006 |
| GB | 2393717 | 4/2004 |
| JP | 4310539 | 11/1992 |
| JP | 09 208254 | 8/1997 |
| WO | WO94/14716 | 7/1994 |
| WO | WO94/25407 | 11/1994 |
| WO | WO96/28394 | 9/1996 |
| WO | WO99/35100 | 7/1999 |
| WO | 00/29344 | 5/2000 |
| WO | WO00/29344 | 5/2000 |

OTHER PUBLICATIONS

International Search Report, dated Mar. 11, 2006 corresponding to International Application No. PCT/US2006/028916.

* cited by examiner

*Primary Examiner*—Jessica L. Ward
*Assistant Examiner*—Nicholas P D'Aniello
(74) *Attorney, Agent, or Firm*—Andrew C. Siminerio

(57) ABSTRACT

A glass composition that includes a base glass composition including: $SiO_2$ from 65 to 75 weight percent, $Na_2O$ from 10 to 20 weight percent, CaO from 5 to 15 weight percent, MgO from 0 to 5 weight percent, $Al_2O_3$ from 0 to 5 weight percent, $K_2O$ from 0 to 5 weight percent, and a colorant and property modifying portion including total iron ranging from of equal to or less than 0.6 weight percent; and $TiO_2$ ranging from 0.1 to 1.0 weight percent, wherein the redox ratio ranges from 0.33 to 0.45 and the weight percents are based on the total weight of the composition.

7 Claims, No Drawings

GREEN GLASS COMPOSITION

FIELD OF THE INVENTION

The present invention relates to glass compositions, particularly, green glass compositions having improved ultraviolet ("UV") performance.

BACKGROUND OF THE INVENTION

Glass substrates are used in a variety of applications such as automotive applications, architectural applications, aerospace applications, etc. Depending on the end use of the glass substrate, it will be desirable for the glass substrate to exhibit certain (a) aesthetic properties, such as, but not limited to, color and (b) solar control properties, such as, but not limited to, total solar energy transmittance ("TSET"), infrared transmittance and ultraviolet transmittance.

For example, in automotive applications, glass substrates are used as automotive vision panels (i.e., front windows, sidelights, etc.). Automotive vision panels need to exhibit a desirable color. At the present time, desirable colors for automotive vision panels include blue, green and gray. Further, if the automotive vision panel is used as a front windshield, it will have to exhibit a visible light transmittance ("Lta") of equal to or greater than 70% in the United States. The Lta requirement for front windshields in countries other than the United States may be different.

The aesthetic properties and solar control properties of a glass substrate can be modified in several of different ways. The first way involves depositing a coating on the surface of a glass substrate. The second way involves changing the chemical composition (i.e., the type of materials that make up the glass composition and/or the weight percentages of the various materials in the glass composition) that make up the glass substrate. Oftentimes, colorants and/or other materials capable of modifying the solar properties of the glass composition are added to a well known base glass composition, such as a soda-lime-silica base glass composition, to provide a glass substrate capable of exhibiting unique performance properties. Although the effect of one colorant or one material capable of modifying the solar properties of the glass composition may be known (for example, it is known that adding FeO to a base glass composition increases the infrared (IR) absorption of the glass composition), it is the essence of invention to use various colorants and/or materials capable of modifying the solar properties of the glass composition, each colorant or material capable of producing a unique effect individually, to achieve a combination of properties collectively.

According to the present invention, specific materials capable of modifying the solar properties of a glass composition are added in specific amounts to a soda-lime-silica base glass composition to provide glass substrates capable of exhibiting the desired aesthetic and solar control properties. The combination of aesthetic and solar control properties provided by glass substrates formed from the glass composition of the present invention are as follows at a reference thickness of 0.189 inches (4.8 mm):

1. a green color characterized by a dominant wavelength ranging from 495 to 535 nanometers and an excitation purity of greater than 1 percent;
2. an Lta equal to or greater than 60 percent;
3. a total solar energy transmittance (TSET) of less than or equal to 48 percent; and
4. a total solar ultraviolet transmittance (SAE UV) of less than or equal to 55 percent.

SUMMARY OF THE INVENTION

In a non-limiting embodiment, the present invention is a glass composition comprising a base glass composition comprising: $SiO_2$ from 65 to 75 weight percent, $Na_2O$ from 10 to 20 weight percent, CaO from 5 to 15 weight percent, MgO from 0 to 5 weight percent, $Al_2O_3$ from 0 to 5 weight percent, and $K_2O$ from 0 to 5 weight percent, and a colorant and property modifying portion comprising total iron ranging from of equal to or less than 0.6 weight percent; and $TiO_2$ ranging from 0.1 to 1.0 weight percent, wherein the redox ratio ranges from 0.33 to 0.45 and the weight percents are based on the total weight of the composition.

In another non-limiting embodiment, the present invention is a glass sheet comprising a glass composition that includes: $SiO_2$ from 65 to 75 weight percent, $Na_2O$ from 10 to 20 weight percent, CaO from 5 to 15 weight percent, MgO from 0 to 5 weight percent, $Al_2O_3$ from 0 to 5 weight percent, and $K_2O$ from 0 to 5 weight percent, and a colorant and property modifying portion comprising total iron ranging from of equal to or less than 0.6 weight percent; and $TiO_2$ ranging from 0.1 to 1.0 weight percent, wherein the redox ratio ranges from 0.33 to 0.45 and the weight percents are based on the total weight of the composition, and wherein the glass sheet exhibits one or more of the following performance properties at a thickness of 0.189 inches (4.8 mm): an Lta of at least 70%,; a TSET of up to 48%; a SAE UV of up to 42%; a DW ranging from 495 to 500 nm; and a Pe of at least 1 percent.

In yet another non-limiting embodiment, the present invention is a laminated glass article comprising a glass sheet made from a glass composition that includes: $SiO_2$ from 65 to 75 weight percent, $Na_2O$ from 10 to 20 weight percent, CaO from 5 to 15 weight percent, MgO from 0 to 5 weight percent, $Al_2O_3$ from 0 to 5 weight percent, and $K_2O$ from 0 to 5 weight percent, and a colorant and property modifying portion comprising total iron ranging from of equal to or less than 0.6 weight percent; and $TiO_2$ ranging from 0.1 to 1.0 weight percent, wherein the redox ratio ranges from 0.33 to 0.45 and the weight percents are based on the total weight of the composition and, wherein the glass sheet exhibits one or more of the following performance properties at a thickness of 0.189 inches (4.8 mm): an Lta of at least 60 percent; a TSET of up to 47 percent; an SAE UV transmittance of up to 55 percent; a DW ranging from 495 to 535 nm; and a Pe of at least 1 percent.

DESCRIPTION OF THE INVENTION

As used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1.0 to 3.8, 6.6 to 9.7 and 5.5 to 10.

The glass composition of the present invention comprises a base glass portion and colorants and materials capable of modifying the solar control properties of the glass. Both colorants and materials capable of modifying the solar control properties of the glass are referred to herein as "colorants and property modifying materials". According to the present invention, the base glass portion includes the components in the amounts shown in Table 1 below.

TABLE 1

Base Glass Portion

| Component | Concentration in the Glass Composition [Weight Percent based on the Total Weight of the Glass Composition] |
|---|---|
| $SiO_2$ | 65-75% |
| $Na_2O$ | 10-20% |
| CaO | 5-15% |
| MgO | 0-5% |
| $Al_2O_3$ | 0-5% |
| $K_2O$ | 0-5% |
| BaO | 0-1% |

The described base glass portion is referred in the art as a "soda-lime-silica" glass composition.

According to the present invention, various colorants and materials capable of modifying the solar performance properties of the glass are added to the base glass composition. The colorants and property modifying materials included in the glass composition of the invention include: iron oxide ($Fe_2O_3$ and FeO) and titanium oxide ("$TiO_2$").

According to the present invention, iron can be present in the glass composition as both ferric oxide ($Fe_2O_3$) and ferrous oxide (FeO). As is well known in the art, $Fe_2O_3$ is a strong absorber of ultraviolet radiation and is a yellow colorant. As is well known in the art, FeO is a strong absorber of infrared radiation and is a blue colorant.

The "total iron" present in the glass composition of the invention is expressed in terms of the weight percentage of "$Fe_2O_3$" present in the glass composition as is standard practice in the industry. This does not imply that all of the iron present in the glass composition is in the form of $Fe_2O_3$. According to the present invention, the total iron in the glass composition of the present invention ranges up to and including 0.6 weight percent based on the total weight of the glass composition, for example, from 0.4 to 0.59 weight percent, or from 0.50 to 0.58 weight percent.

The amount of iron present in the ferrous state in the glass composition of the present invention is expressed in terms of the weight percentage of "FeO" present in the glass composition as is standard practice in the industry. Although the amount of iron in the ferrous state is expressed as FeO, the entire amount in the ferrous state may not actually be present in the glass as FeO.

The glass composition of the present invention has a certain "redox ratio". As used herein, the "redox ratio" is the amount of iron in the ferrous state (expressed as "FeO") divided by the amount of total iron (expressed as "$Fe_2O_3$"). Glass compositions according to the present invention have a redox ratio ranging from 0.33 to 0.45, for example, from 0.36 to 0.42, or from 0.37 to 0.40.

The glass composition of the present invention contains $TiO_2$ in an amount ranging from 0.1 weight percent to 1.0 weight percent, for example, from 0.2 weight percent to 0.5 weight percent, where the weight percent is based on the total weight of the glass composition. $TiO_2$ is known in the art as an absorber of ultraviolet radiation.

In a non-limiting embodiment, the glass composition of the invention can contain molybdenum oxide ($MoO_3$) to inhibit the formation of nickel-sulfide stones which can be present in glass and degrade the quality of the glass. $MoO_3$ can be added to the composition of the invention in an amount ranging from 10 to 750 PPM, for example, from 100 to 300 PPM.

The glass composition of the present invention can be produced by conventional glass making processes. For example, the glass composition can be formed from batch materials via crucible melts, a sheet drawing process, a float glass process, etc. Typically, well known batch materials are mixed with other components to form the starting materials which are processed into the glass compositions of the present invention. In a non-limiting embodiment, the glass composition of the present invention is formed via a float glass process as is well known in the art.

As a result of the raw materials and/or equipment used to produce the glass composition of the present invention, certain impurities, for example, SrO and $ZrO_2$, can be present in the final glass composition. Such materials are present in the glass composition in minor amounts and are referred to herein as "tramp materials". Tramp materials do not contribute to the performance properties of the glass.

In a non-limiting embodiment of the invention, the described glass composition is formed into a glass substrate and/or laminated glass article as is well known in the art. Glass substrates having various thicknesses can be formed. For example, glass substrates having a thickness of up to 24 mm can be formed.

In a non-limiting embodiment, the present invention is a laminated article made up of at least one glass substrate according to the present invention wherein such glass substrate exhibits one or more of the following performance properties at a thickness of 0.189 inches (4.8 mm):

1. a green color characterized by a dominant wavelength ranging from 495 to 535 nanometers, for example, from 500 to 530 nanometers, or from 505 to 525 nanometers and an excitation purity of greater than or equal to 1 percent, for example, greater than or equal to 2 percent, or greater than or equal to 3 percent;

2. an Lta of equal to or greater than 60 percent, for example, equal to or greater than 65 percent, or equal to or greater than 70 percent;

3. a TSET less than or equal to 48 percent for example, equal to or less than 45 percent, or equal to or less than 43 percent; and 4. a total solar ultraviolet transmittance (expressed in terms of "SAE UV ") of less than or equal to 55 percent, for example, equal to or less than 52 percent, or equal to or less than 50 percent.

According to the present invention, the abovementioned performance properties are measured as described below:

The visible light transmittance (Lta) represents a computed value based on measured data using C.I.E. 1931 standard illuminant "A" over the wavelength range of 380 to 770 nanometers at 10 nanometer intervals.

The total solar ultraviolet transmittance (SAE UV) represents a computed value based on measured data over the wavelength range of 300 to 400 nanometers at 5 nanometer intervals using the SAE 1796 standard.

The total solar energy transmittance (TSET) represents a computed value based on measured transmittances from 300 to 2500 nanometers at 50 nanometer intervals.

Color is described in terms of dominant wavelength (DW) and the excitation purity (Pe) represent computed values based on measured data using a C.I.E. 1931 standard illuminant "C" with a 2° observer.

All solar transmittance data is calculated using air mass solar data according to the ASTM am1.5g (E892T. 1). All of the transmittance values are integrated over the wavelength range using the Trapezoidal Rule, as is well known in the art.

In a non-limiting embodiment of the invention, the glass substrate is used as a glass vision panel. In a further non-limiting embodiment, the glass vision panel is an automotive front windshield that exhibits an Lta equal to or greater than 70%.

EXAMPLES

The present invention is illustrated by the following non-limiting examples. The Examples were made in the following manner.

For Examples 1-2, the batch materials were weighed out, mixed and added into a crucible. The batch materials are shown in Table 2 below. All material weights are in grams. The batch materials were melted in an 8 inch platinum crucible in an electric resistance furnace set to a temperature of 2,450° F. (1,343° C.) in an air atmosphere for 30 minutes. The furnace temperature was raised to 2,500° F. (1,371° C.), and the batch materials were heated for 30 minutes. The furnace temperature was raised to 2,550° F. (1,399° C.), and the batch materials were heated for 30 minutes. The furnace temperature was raised to 2,650° F. (1,454° C.), and the batch materials were heated for 30 minutes. The glass melt was then poured into water at room temperature (referred to as "glass fritting" in the art) to produce a glass frit. The glass frit was dried in an annealing oven set to a temperature of 1,100° F. (593° C.) for 20 minutes. The glass frit was placed back into a crucible, and the crucible was placed in an oven set to a temperature of 2,650° F. (1,454° C.). The glass frit was then heated in the oven for one hour.

The contents of the crucible were fritted again as described above. The glass frit was then placed in a crucible, and the crucible was placed in an oven set to a temperature of 2,650° F. (1,454° C.). The glass frit was then heated in the oven for two hours. The glass melt was then cast on a metal table. The resulting glass sheet was placed into an annealing lehr set to a temperature of 1,100° F. (593° C.) for one hour. The power to the lehr was shut off, and the glass sheet was allowed to stay in the lehr for sixteen hours as it cooled down. Examples made from the glass melts were next ground and polished.

For Examples 3-10, the batch materials were weighed out, mixed and added into a crucible. Half of the batch materials were melted in a 4 inch platinum crucible in an electric resistance furnace set to a temperature of 2,450° F. (1,343° C.) in an air atmosphere for 30 minutes. Then, the other half of the batch materials was added to the crucible. The furnace temperature was raised to 2,500° F. (1,371° C.), and the batch materials were heated for 30 minutes. The furnace temperature was raised to 2,55020 F. (1,399° C.), and the batch materials were heated for 30 minutes. The furnace temperature was raised to 2,650° F. (1,454° C.), and the batch materials were heated for 30 minutes. The glass melt was fritted to produce a glass frit in a manner as discussed earlier. The glass frit was dried in an annealing oven set to a temperature of 1,100° F. (593° C.) for 20 minutes. The glass frit was placed back into a crucible, and the crucible was placed in an oven set to a temperature of 2,650° F. (1,454° C.). The glass frit was then heated the oven for one hour. The contents of the crucible were fritted again as described above. The glass frit was placed in a crucible, and the crucible was placed in an oven set to a temperature of 2,650° F. (1,454° C.). The glass frit was then heated in the oven for two hours. The glass melt was cast on a metal table. The resulting glass sheet was placed into an annealing lehr set to a temperature of 1,1 00° F. (593° C.) for one hour. The power to the lehr was shut off, and the glass sheet was allowed to stay in the lehr for sixteen hours as it cooled down. Examples made from the glass melts were ground and polished.

TABLE 2

Glass Batch Materials

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Sand [g] | 1000 | 1000 | 500 | 500 | 500 | 500 | 500 | 500 | 500 | 500 |
| Soda Ash [g] | 326 | 326 | 163 | 163 | 163 | 163 | 163 | 163 | 163 | 163 |
| Limestone [g] | 128 | 128 | 64 | 64 | 64 | 64 | 64 | 64 | 64 | 64 |
| Dolomite [g] | 204 | 204 | 102 | 102 | 102 | 102 | 102 | 102 | 102 | 102 |
| Salt cake [g] | 10 | 10 | 5 | 5 | 5 | 3.5 | 2.5 | 2.5 | 2.5 | 2.5 |
| Rouge [g] | 7.5 | 7.5 | 3.75 | 3.75 | 3.75 | 3.75 | 4.05 | 4.05 | 4.15 | 4.15 |
| $TiO_2$ [g] | 7.0 | 7.0 | 3.5 | 3.5 | 3.5 | 3.5 | 4.0 | 4.0 | 4.0 | 4.0 |
| Coal [g] | 1.0 | 1.1 | 0.85 | 0.6375 | 0.6375 | — | 0.45 | 0.50 | 0.50 | 0.55 |
| Si [g] | — | — | — | 0.2338 | 0.2975 | 1.30 | — | — | — | — |

Compositional information for the exemplary glass compositions made according to the present invention is shown below in Table 3. The exemplary compositions did contain the following tramp materials which are not included in the table: $SO_3$, SrO, $ZrO_2$, Cl and BaO.

TABLE 3

Glass Compositions according to the Present Invention

| Component | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| $SiO_2$ | 71.73 | 71.64 | 73.31 | 73.31 | 73.19 | 73.27 | 73.45 | 73.16 | 73.38 | 73.05 |
| $Na_2O$ | 13.75 | 13.79 | 13.08 | 13.12 | 13.18 | 13.09 | 12.91 | 13.04 | 12.92 | 13.13 |
| $K_2O$ | 0.039 | 0.028 | 0.028 | 0.028 | 0.027 | 0.027 | 0.035 | 0.036 | 0.038 | 0.039 |

TABLE 3-continued

Glass Compositions according to the Present Invention

| Component | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| CaO | 9.83 | 9.89 | 9.25 | 9.23 | 9.28 | 9.26 | 9.17 | 9.29 | 9.23 | 9.31 |
| MgO | 3.34 | 3.38 | 3.14 | 3.11 | 3.14 | 3.13 | 3.13 | 3.14 | 3.12 | 3.13 |
| $Al_2O_3$ | 0.09 | 0.09 | 0.11 | 0.10 | 0.10 | 0.10 | 0.13 | 0.13 | 0.13 | 0.13 |
| $Fe_2O_3$ | 0.538 | 0.534 | 0.520 | 0.521 | 0.526 | 0.526 | 0.560 | 0.573 | 0.589 | 0.594 |
| $TiO_2$ | 0.444 | 0.439 | 0.430 | 0.432 | 0.438 | 0.436 | 0.490 | 0.499 | 0.494 | 0.500 |
| REDOX RATIO | 0.372 | 0.388 | 0.398 | .0358 | 0.390 | 0.343 | 0.386 | 0.375 | 0.406 | 0.402 |

Table 4 shows various performance properties of glass substrates having a thickness of 0.189 inches (4.8 mm) formed from glass compositions according to the present invention. The spectral properties of the Examples were measured using a Perkin Elmer Lambda 9 spectrophotometer.

TABLE 4

Performance Properties of Substrates made from Glass Compositions according to the Present Invention

| Performance Property | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Lta [%] | 72.63 | 72.23 | 72.78 | 73.96 | 72.10 | 73.81 | 71.41 | 71.52 | 69.68 | 69.52 |
| TSET [%] | 44.72 | 44.04 | 44.19 | 46.34 | 44.01 | 46.75 | 42.59 | 42.72 | 40.22 | 40.13 |
| SAE UV [%] | 38.01 | 38.26 | 40.82 | 40.61 | 40.28 | 39.77 | 36.54 | 36.45 | 35.54 | 35.21 |
| DW [nm] | 498.29 | 497.35 | 496.61 | 497.89 | 496.87 | 498.90 | 499.51 | 499.87 | 499.06 | 499.29 |
| Pe [%] | 4.02 | 4.36 | 4.49 | 3.86 | 4.40 | 3.55 | 4.08 | 3.97 | 4.52 | 4.47 |

Table 5 shows various performance properties of laminated glass articles formed from glass compositions according to the present invention. A computer model was used to calculate the spectral properties and color for laminated glass articles based on the measured data for a single substrate. The modeled laminated article contained two pieces of glass, each having the same composition and thickness as specified in Table 5, and a 0.030 inches (0.76 mm) thick, ultraviolet radiation absorbing, vinyl interlayer commercially available from E. I. du Pont de Nemours and Company (Wilmington, Del.) as BE1700.

TABLE 5

Performance Properties of Laminated Articles including a Substrate made up from a Glass Composition according to the Present Invention

| Performance Property | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Thickness of each glass substrate [mm] | 2.29 | 2.24 | 2.24 | 2.44 | 2.24 | 2.51 | 2.11 | 2.11 | 1.93 | 1.93 |
| Laminate thickness [mm] | 5.33 | 5.23 | 5.23 | 5.64 | 5.23 | 5.79 | 4.98 | 4.98 | 4.62 | 4.62 |
| Lta [%] | 72.49 | 72.47 | 72.99 | 72.78 | 72.35 | 72.14 | 72.63 | 72.74 | 72.51 | 72.38 |
| TSET [%] | 41.99 | 41.84 | 41.88 | 41.97 | 41.74 | 41.70 | 41.87 | 42.01 | 41.62 | 41.57 |
| SAE UV [%] | 2.70 | 2.72 | 2.79 | 2.74 | 2.76 | 2.69 | 2.05 | 2.05 | 2.06 | 2.06 |
| DW [nm] | 501.90 | 500.60 | 499.67 | 501.38 | 500.03 | 502.76 | 503.53 | 504.10 | 502.93 | 503.23 |
| Pe [%] | 3.38 | 3.59 | 3.69 | 3.45 | 3.61 | 3.26 | 3.17 | 3.07 | 3.22 | 3.19 |

CONCLUSIONS

Based on Table 4, non-limiting examples of the glass composition of the present invention can be used to form glass substrates having a thickness of 0.189 inches (4.8 mm) that exhibit one or more of the following performance properties: an Lta of greater than 70%, for example, from 72 to 75%; a TSET of less than 48%, for example, from 44 to 47%; a SAE UV of less than 42%, for example, from 37 to 41%; a DW ranging from 495 to 500 nm; and a Pe of greater than 3%, for example, from 3.3 to 4.5%.

Based on Table 5, non-limiting examples of the glass composition of the present invention can be used to form laminated glass articles that exhibit one or more of the following performance properties: an Lta of greater than 70%, for example, from 72 to 75%; a TSET of less than 44%, for example, from 40 to 43%; a SAE UV of less than 5%, for example, from 2 to 3% (a significant amount of the exhibited UV absorption in the laminate examples is attributable to the interlayer); a DW ranging from 497 to 505 nm; and a Pe of greater than 1%, for example, from 3 to 5%.

It will be readily appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

I claim:

1. A glass sheet comprising:
a base glass composition comprising:

| | |
|---|---|
| $SiO_2$ | 65 to 75 weight percent, |
| $Na_2O$ | 10 to 20 weight percent, |
| CaO | 5 to 15 weight percent, |
| MgO | 0 to 5 weight percent, |
| $Al_2O_3$ | 0 to 5 weight percent, and |
| $K_2O$ | 0 to 5 weight percent; | a colorant and property modifying portion consisting essentially of:
total iron expressed in terms of weight percentage of "$Fe_2O_3$" ranging from equal to or less than 0.60 weight percent;
$TiO_2$ ranging from 0.1 to 1.0 weight percent, and
a redox ratio ranging from 0.36 to 0.42, wherein the weight percents are based on the total weight of the composition, and the redox ratio is the amount of iron in the ferrous state expressed as "FeO" divided by the amount of total iron expressed as "$Fe_2O_3$", and
the glass sheet exhibits the following performance properties at a thickness of 0.189 inches (4.8 mm):
an Lta of at least 70%;
a TSET of up to 48%;
a SAE UV of up to 55%;
a dominant wavelength ranging from 495 to 535 nm; and
a Pe of at least 1%.

2. The glass sheet according to claim 1, wherein the total iron ranges from 0.40 to 0.59 weight percent; the $TiO_2$ ranges from 0.2 to 0.5 weight percent, and the redox ratio ranges from 0.37 to 0.40.

3. A glass sheet comprising a glass composition that includes:

| | |
|---|---|
| $SiO_2$ | 65 to 75 weight percent, |
| $Na_2O$ | 10 to 20 weight percent, |
| CaO | 5 to 15 weight percent, |
| MgO | 0 to 5 weight percent, |
| $Al_2O_3$ | 0 to 5 weight percent, and |
| $K_2O$ | 0 to 5 weight percent, and | a colorant and property modifying portion consisting essentially of;
total iron expressed in terms of weight percentage of "$Fe_2O_3$" ranging from equal to or less than 0.60 weight percent;
$TiO_2$ ranging from 0.1 to 1.0 weight percent, and
redox ratio ranging from 0.37 to 0.40 wherein the weight percents are based on the total weight of the composition, and the redox ratio is the amount of iron in the ferrous state expressed as "FeO" divided by the amount of total iron expressed as "$Fe_2O_3$", and
wherein the glass sheet exhibits the following performance properties at a thickness of 0.189 inches (4.8 mm):
an Lta of at least 70%;
a TSET of up to 48%;
a SAE UV of up to 42%;
a dominant wavelength ranging from 495 to 500 nm; and
a Pe of at least 1 percent.

4. The glass sheet according to claim 3, wherein the glass composition has $TiO_2$ ranging from 0.2 to 0.5 weight percent.

5. A laminated glass article comprising a glass sheet made from a glass composition that includes:

| | |
|---|---|
| $SiO_2$ | 65 to 75 weight percent, |
| $Na_2O$ | 10 to 20 weight percent, |
| CaO | 5 to 15 weight percent, |
| MgO | 0 to 5 weight percent, |
| $Al_2O_3$ | 0 to 5 weight percent, and |
| $K_2O$ | 0 to 5 weight percent, | and a colorant and property modifying portion consisting essentially of:
total iron expressed in terms of weight percentage of "$Fe_2O_3$" ranging from equal to or less than 0.60 weight percent;
$TiO_2$ ranging from 0.1 to 1.0 weight percent, and
redox ratio of the glass sheet ranging from 0.37 to 0.40 wherein the weight percents are based on the total weight of the composition, and the redox ratio is the amount of iron in the ferrous state expressed as "FeO" divided by the amount of total iron expressed as "$Fe_2O_3$", and
wherein the glass sheet exhibits the following performance properties at a thickness of 0.189 inches (4.8 mm):
an Lta of at least 70 percent;
a TSET of up to 48 percent;
an SAE UV transmittance of up to 55 percent;
a dominant wavelength ranging from 495 to 535 nm; and
a Pe of at least 1 percent.

6. The laminated glass article according to claim 5 wherein the total iron of the glass sheet ranges from 0.40 to 0.59 weight percent.

7. The laminated glass article according to claim 6, wherein the $TiO_2$ of the glass sheet ranges from 0.2 to 0.5 weight percent.

* * * * *